Patented May 16, 1950

2,507,871

UNITED STATES PATENT OFFICE 2,507,871

INTERPOLYMERS OF ALLYL ALCOHOL AND ALKYL DIESTERS OF AN ALPHA-UNSATURATED DICARBOXYLIC ACID

Pliny O. Tawney, Passaic, N. J., assignor to United States Rubber Company, New York, N. Y., a corporation of New Jersey No Drawing. Application April 18, 1946, Serial No. 663,244

4 Claims. (Cl. 260—78.5)

This invention is concerned with the preparation of a new class of soluble, thermoplastic polymers which can undergo chemical modifications to produce soluble, unsaturated resins capable of further polymerization to a solvent and heat-resistant state. Particularly, the invention relates to soluble, fusible polymeric materials prepared by the direct copolymerization of a 2-propenyl alcohol with at least one monomeric ester of a non-enic (i. e., non-olefinic and non-acetylenic) monohydric alcohol and an α-unsaturated dicarboxylic acid, and to the unsaturated resins obtained by alcoholysis of said copolymers with 2-propenyl alcohols.

This application is a continuation-in-part of my application Serial No. 515,431, filed December 23, 1943, now abandoned.

It is known that copolymers of a 2-propenyl alcohol and an ester of an α-unsaturated dicarboxylic acid can be prepared by hydrolyzing a copolymer of a 2-propenyl ester and an α-unsaturated dicarboxylic acid ester as exemplified in the following equation, involving a copolymer of allyl acetate and diethyl fumarate.

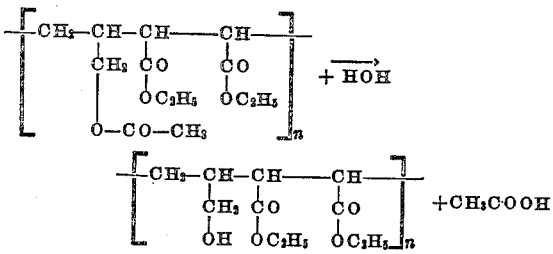

However, I have found that in practice this method is open to at least two objections. First, the hydrolysis reaction is necessarily of long duration because of the high molecular weight of the ester involved, i. e., the copolymer. Such long reaction times severely curtail the production capacity of a reaction vessel and often facilitate secondary reactions, e. g., concurrent hydrolysis of the dicarboxylic acid ester groups, which may lead to products of an undesirable and/or uncertain character. Second, because of the disposition and proximity of adjacent side-chain groups in the copolymer, it is extremely difficult to insure complete hydrolysis of the allyl ester groups and thus provide the maximum number of hydroxyl groups. The presence of free hydroxyl groups in these interpolymers is important not only because they permit further modifications by treatment with various reactive chemical agents but also to achieve products of maximum softening temperature and resistance to carbonylic and hydrocarbon solvents.

It is an object of this invention to avoid the above mentioned difficulties and to secure uniform products whose properties and chemical structure are easily reproducible. This object I attain by interpolymerizing directly a 2-propenyl alcohol selected from the class consisting of allyl alcohol and 2-alkyl-allyl alcohols, e. g., methallyl alcohol and ethallyl alcohol, with one or more esters of α-unsaturated dicarboxylic acids selected from the class consisting of maleic, fumaric, citraconic, mesaconic, and itaconic acids, and the monohydric non-enic alcohols, such as methyl, ethyl, propyl, butyl, isobutyl, amyl, cyclohexyl, benzyl, and phenethyl alcohols, and the corresponding phenyl and tolyl diesters. The latter illustrate aromatic diesters of said acids. Particular examples of such esters, among others, are dimethyl citraconate, dibutyl maleate, dimethyl mesaconate, and di-2-ethyl-hexyl itaconate. They all are simple diesters. Groups like benzyl and phenethyl are functionally aliphatic like methyl, ethyl, etc. The esters may be described as monomeric simple diesters of α-unsaturated dibasic acids in which the ester-forming groups (replacement for carboxylic hydrogen) are aromatic radicals or non-enic functionally aliphatic radicals.

Although the 2-propenyl alcohols homopolymerize with difficulty, and in low yields, to products of very low molecular weight, I have found that they can be readily interpolymerized with esters of the above-mentioned α-unsaturated dicarboxylic acids to give excellent yields of moderately high molecular weight interpolymers.

The formation of my initial copolymers is exemplified by the following equations involving methallyl alcohol and diethyl fumarate.

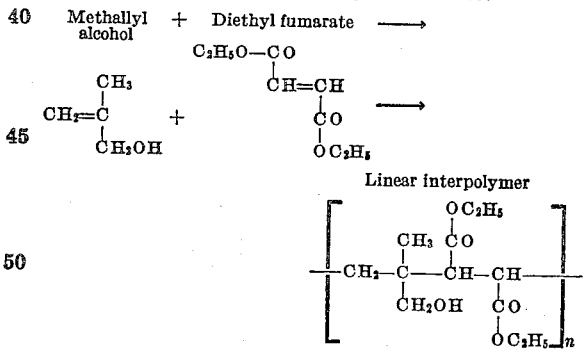

I have further discovered that in the practice of my invention the linear interpolymer, formed as indicated above, undergoes two secondary reactions with the elimination of an alcohol from the fumaric ester portion to form a new and useful class of polymeric materials.

1. The fumaric ester unit of the polymer chain undergoes an alcohol interchange reaction with the monomeric methallyl alcohol in the reaction mixture, thus:

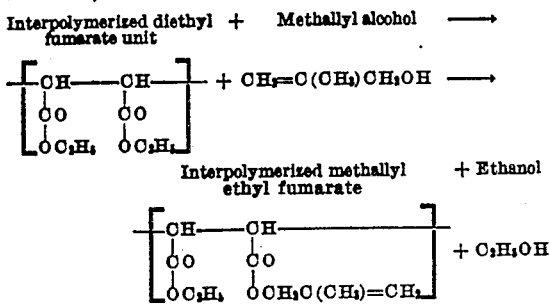

This alcoholysis reaction is favored by an excess of the 2-propenyl alcohol in the reaction mixture.

2. A fumaric ester unit of the interpolymer undergoes lactone formation with an adjacent methallyl alcohol unit thus:

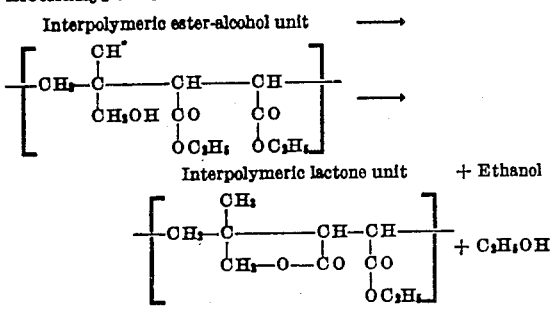

This lactone formation is favored by high reaction temperatures.

My new interpolymers prepared from methallyl alcohol and diethyl fumarate therefore consists of a linear polymeric chain containing a plurality of the following units:

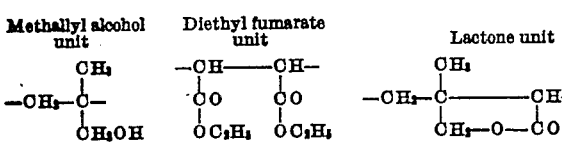 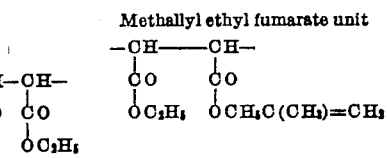

Although the above remarks concerning the structure of my new polymeric products have been directed specifically to copolymers of methallyl alcohol and diethyl fumarate, they are generally applicable to all the copolymers of the 2-propenyl alcohols with esters of α-unsaturated dicarboxylic acids as previously defined, i. e., the copolymers of the 2-propenyl alcohols with the aforesaid α-unsaturated dicarboxylic esters all undergo the secondary reactions of alcoholysis and lactonization.

For the preparation of my new interpolymers, I may carry out the polymerization reaction en masse, i. e., in a mixture of monomeric materials only, or if desired, in the presence of solvents, diluents, emulsifying agents, etc. The reaction temperatures may range from about 25° C. up to the reflux temperature of the reaction mixture and for overall economy it is preferable to operate in the upper part of this range.

To accelerate the interpolymerizations, there may be used inorganic peroxides such as hydrogen peroxide and per-salts (e. g., percarbonates and persulfates) for the emulsion polymerizations, while for the en masse and solution polymerizations organic peroxides such as acetyl peroxide, benzoyl peroxide, ter-butyl hydrogen peroxide, lauroyl peroxide and succinyl peroxide are satisfactory.

According to their intended use, the properties of my interpolymers, such as their flexibility, toughness, tensile strength, solubility, etc., can be varied over a considerable range by altering the relative proportions of the monomeric starting materials. The molar ratio of the 2-propenyl alcohol to the α-unsaturated dicarboxylic acid ester in the reactant mixture is preferably maintained in the approximate range of from 10:1 to 1:5 since the copolymers obtained from reactant mixtures outside this range are often inferior with respect to yield and likewise entail considerable purification to remove unreacted monomers. Reactant mixtures containing over 50% (by weight) of the 2-propenyl alcohol yield interpolymers which are relatively hard and tough, and contain the maximum number of hydroxyl groups, and the high concentration of 2-propenyl alcohol likewise encourages the secondary alcoholysis reaction whereby unsaturated interpolymers are obtained. When the reactant mixture contains over 50% (by weight) of the α-unsaturated dicarboxylic acid ester, the resulting interpolymers tend to be of the softer and more flexible type. For a given molar ratio of 2-propenyl alcohol to the α-unsaturated dicarboxylic ester, the flexibility and hydrocarbon-miscibility of the resulting copolymers can be increased by employing the α-unsaturated dicarboxylic acid esters of higher alcohols, e. g., of n-butanol and hexanol.

By reacting the copolymerizable monomers in the presence of a solvent, the resulting solutions of the interpolymers can be employed directly as coating and impregnating compositions, and in the case of the emulsion polymerizations, the interpolymers are obtained as milky latices which may be used in the same manner as the above mentioned solutions. If rubber-like products are desired, plasticizers or softening agents can be conveniently incorporated with the interpolymers by adding them to the solutions or emulsions of the interpolymers prior to isolating the products. The interpolymers are obtained from solution by precipitating them with a non-solvent such as n-hexane or from the emulsion by flocculating with electrolytes. The products are purified by extracting any unreacted starting materials with solvents in which the interpolymers are insoluble, and drying. They are then readily applicable to the preparation of filaments, sheets and castings whose resistance to attack by hydrocarbon solvents is proportional to the amount of free hydroxyl groups present in the interpolymer.

My products are usually transparent and hence are suitable for the incorporation of dyes and pigments. To avoid contamination and discoloration, the interpolymerizations may be carried out in glass-lined vessels and under a blanket of inert gas.

My copolymers are not only suitable for many of the applications of thermoplastic resins, but they are of further potential utility by virtue of their chemical structure. For example, the presence of free hydroxyl groups permits of considerable modification in the properties of the copolymers by treatment with chemical hydroxyl-reactive agents known to react with primary hydroxyl groups, such as organic acids or their anhydrides or halides, and isocyanates, aldehydes, etc. Moreover, by employing polyfunctional reagents such as dibasic acids or their anhydrides, diisocyanates, etc., my copolymers can be easily cross-linked and thereby rendered impervious to attack by solvents. Alternatively, my interpolymers can be cross-linked by treatment with unsaturated acids or alcohols or their derivatives, reactive with hydroxyl groups, such as methacrylic acid, allyl alcohol, acrylyl chloride, methallyl chloride, etc., followed by polymerization or copolymerization of the unsaturated polymeric esters so produced to insoluble, infusible resins.

A further advantage of my copolymers is that they are easily soluble in certain solvents, particularly 2-propenyl alcohols. Thus the copolymers of methallyl alcohol and diethyl fumarate dissolve readily in methallyl alcohol to form clear solutions of high concentration. The high solubility of my interpolymers in 2-propenyl alcohols is particularly advantageous since it permits an alcohol interchange to be carried out between my linear interpolymer esters and 2-propenyl alcohols without the need of a mutual solvent such as is required for practical purposes in the alcoholysis of many homopolymers, thereby effecting a saving both in time and material cost. The alcoholysis of my interpolymers with 2-propenyl alcohols leads to a new class of soluble, unsaturated resins of wide utility since they can be readily converted to insoluble, infusible materials by further polymerization.

As mentioned, the formation of my interpolymers is attended by a secondary reaction of alcoholysis. This effect can be employed advantageously, for, since my interpolymers are highly soluble in 2-propenyl alcohols, the copolymerization and alcoholysis reactions can be carried out concurrently without the necessity of isolating the initial interpolymer.

When large amounts of unsaturation are to be introduced, however, it is preferable to first isolate and purify the copolymer and then to carry out the alcoholysis in a subsequent reaction. This method is particularly advantageous when it is desired to alcoholyze my interpolymers with a mixture of unsaturated alcohols or with a mixture of saturated and unsaturated alcohols.

My interpolymers can be alcoholyzed by dissolving them in a 2-propenyl alcohol such as allyl or chlorallyl alcohol and heating the resulting solution. Catalysts of the basic type, such as sodium hydroxide, or of the acidic type, such as p-toluene sulphonic acid, may be added to accelerate the alcohol interchange. When the alcoholysis involves 2-alkylallyl alcohols, e. g., methallyl alcohol, a basic catalyst is preferred since the 2-alkylallyl alcohols tend to rearrange to aldehydes in the presence of acids.

The amount of unsaturation introduced into the interpolymer can of course be varied by altering the time of reaction for the alcohol interchange. Where long reaction times are involved, inhibitors such as copper, hydroquinone, etc., may be added to the reaction mixture to avert premature polymerization of the alcoholyzed product.

The alcoholysis reaction is particularly well adapted to the production of interpolymers of a 2-propenyl alcohol with an ester of an α-unsaturated dicarboxylic acid and an alcohol which has a normal boiling point lower than that of the 2-propenyl alcohol (e. g., diethyl fumarate, diisopropyl itaconate, etc.). The interchange can be accelerated by regulating the temperature so that the lower boiling of the alcohols, freed during the interchange reaction, e. g., methanol or ethanol, can be removed by continuous or intermittent distillation from the reaction mixture. At the end of the reaction, the unreacted 2-propenyl alcohol can be removed by distillation or extraction, and if necessary the residue can be further purified by dissolving it in a solvent such as acetone, and precipitating it with a nonsolvent such as n-hexane.

The pure alcoholyzed product is a clear, thermoplastic material soluble in many solvents. At elevated temperatures such as 180° C., and/or in the presence of polymerization catalysts such as organic peroxides, it is capable of being converted to a transparent, insoluble, infusible resin. The convertible resin is suitable for use in coating, impregnating and laminating operations where pre-formed articles capable of being "set" or cured are desired. Compatible plasticizers, softening agents, pigments, fillers, etc., can be readily incorporated with the resin in the soluble, thermoplastic stage prior to final cure.

The unsaturated interpolymer can also be copolymerized with a wide variety of polymerizable ethylenic

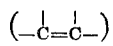

monomers, such as methyl acrylate, methyl methacrylate, diallyl fumarate, and allyl acrylate. Furthermore, my alcoholyzed interpolymers are miscible over a wide range of proportions with many of the mentioned copolymerizable compounds, and the solutions containing high concentrations of the alcoholyzed interpolymers in the appropriate monomers often have sufficiently low viscosities to permit their application by spraying, brushing, or dipping. Elevated temperatures, e. g., 150° C., and/or a polymerization catalyst, such as an organic peroxide, readily convert these thermosetting compositions to insoluble, infusible products with a minimum of the cracking, "blowing" and shrinking often associated with the elimination of a volatile, non-polymerizable solvent from the cured product.

My interpolymers which have been alcoholyzed to such an extent that the percentage of 2-propenyl alcohol radicals therein is substantially greater than that of the saturated alcohol radicals, are particularly advantageous for this purpose because of their high rate of solution in the copolymerizable monomers and because of the speed of the resulting conversion to insoluble, infusible products.

The following examples disclose the practice of my invention in more detail, all parts being by weight:

*Example 1*

(a) A mixture of 174 parts of allyl alcohol, 516 parts of diethyl fumarate, and 10.35 parts of benzoyl peroxide is heated for 21 hours at gentle reflux. The reaction mixture is then cooled and poured into a commercial grade of n-hexane. The precipitated copolymer is further purified by repeated solution in acetone and precipitation with n-hexane. After drying to constant weight in vacuo 165 parts of polymeric solid are obtained which are readily soluble in acetone, chloroform, allyl alcohol, methallyl alcohol, chlorallyl alcohol, and hot ethanol.

Analysis: Found—C, 57.84%; H, 6.68%; iodine (Wijs) number, 1.4; limiting viscosity $[\eta]_0$ in acetone, 0.028.

The elementary analysis indicates the relative amounts of the allyl alcohol, diethyl fumarate, and the isomeric mixture of allyl ethyl fumarate and lactone, in the interpolymer. The iodine number corresponds to the amount of allyl ethyl fumarate present, and the amount of the isomeric lactone is determined by difference. This procedure indicates the following composition:

| Interpolymeric Unit | Weight, Per Cent | Moles |
| --- | --- | --- |
| Allyl Alcohol | 0.5 | 1.0 |
| Diethyl Fumarate | 30.00 | 20.25 |
| Lactone | 59.72 | 37.60 |
| Allyl Ethyl Fumarate | 9.78 | 6.17 |

This corresponds to an interpolymer derived from approximately 81% of diethyl fumarate and 19% of allyl alcohol.

(b) A mixture of 50 parts of the interpolymer, 17.2 parts of n-butyl acid maleate, and 0.067 part of p-toluene sulfonic acid is heated with agitation under a blanket of carbon dioxide for 2.5 hours at 170–180° C. Seven parts of the viscous reaction product are mixed with 3.0 parts of vinyl acetate and 0.1 part of benzoyl peroxide and heated in a cylindrical mold for 2 hours at 40° C., then for 1 hour at 60° C., and finally for 1.8 hours at 110° C. The resulting clear, somewhat flexible casting is insoluble in acetone. A similar casting is obtained when methyl acrylate is copolymerized with the resin in place of the vinyl acetate above.

*Example 2*

(a) A copolymer of allyl alcohol and dimethyl itaconate is prepared by heating a mixture of 237 parts of dimethyl itaconate, 87 parts of allyl alcohol, and 4.86 parts of benzoyl peroxide, at 85–90° C., for 17.5 hours. After isolation and purification, as in Example 1 above, 185 parts of a white polymeric solid are obtained which dissolve readily in acetone, cyclohexanone, acetonitrile, and in 2-propenyl alcohols.

Analysis: Found—C, 56.44%; H, 7.10%; iodine number 4.1

The analysis indicates the following composition:

| Interpolymeric Unit | Weight, Per Cent | Moles |
| --- | --- | --- |
| Allyl Alcohol | 28.0 | 1.0 |
| Dimethyl Itaconate | 61.3 | 0.808 |
| Allyl Methyl Itaconate | 2.93 | 0.033 |
| Lactone | 7.77 | 0.087 |

This corresponds to an interpolymer derived from approximately 69.5% of dimethyl itaconate and 30.5% of allyl alcohol.

(b) A mixture of 32.4 parts of the interpolymer and 7.0 parts of maleic anhydride, is heated at 105–110° C. for 8 minutes. The reaction is halted by quickly cooling to room temperature.

Three parts of the reacted mixture, together with 2 parts of triethylene glycol, are dissolved in a mixture of 1 part of cyclohexanone and 10 parts of acetone. The solution is poured on a glass panel, and after the solvent has evaporated, the resulting film is baked at 180° C. for 0.5 hour, forming a hard, clear, insoluble coating which displays good scratch resistance.

*Example 3*

A mixture of 32.1 parts of allyl alcohol, 81.6 parts of dimethyl itaconate, and 1.79 parts of benzoyl peroxide is dissolved in 29 parts of cyclohexane and heated for 9.7 hours at 87–89° C. The product is purified by dissolving it in acetone and precipitating it with n-hexane. The vacuum-dried copolymer is a white solid which is soluble in acetone, allyl alcohol, and methallyl alcohol, but insoluble in n-hexane and in benzene.

Analysis: Found—C, 55.86%; H, 6.82%; iodine number (Wijs) 4.7 $[\eta]_0$, 0.0243.

The analysis indicates that the polymer contains approximately 66.8% by weight of interpolymerized dimethyl itaconate units, 9.9% of allyl alcohol units, 3.34% of allyl methyl itaconate units, and 20.0% of the isomeric lactone units. This corresponds to a copolymer prepared from approximately 16.3% by weight of allyl alcohol and 83.7% of dimethyl itaconate.

A solution of 3 parts of the interpolymer dissolved in a mixture of 5 parts of acetone and 1 part of cyclohexanone is flowed onto a glass panel and baked at 200° C. for 20 minutes to yield a clear, adherent film.

*Example 4*

A mixture of 15.82 parts of dimethyl itaconate, 7.20 parts of methallyl alcohol, and 0.241 part of benzoyl peroxide is heated under an atmosphere of nitrogen for 70 hours at 60° C. The product is purified by repeatedly dissolving it in acetone and precipitating it with n-hexane and after being dried in vacuo, it amounts to 7.49 parts of polymeric solid which is readily soluble in ketones, and 2-propenyl alcohols. It softens at 85° C. and becomes fluid at 140° C.

Analysis: Found—C, 55.66%; H, 6.94%.

From the analysis the interpolymer is calculated to contain approximately 81.5% by weight of dimethyl itaconate units, 9.5% of methallyl alcohol units and 9.0% of methallyl methyl itaconate and/or the isomeric lactone units. This corresponds to an interpolymer formed from approximately 87.8% by weight of dimethyl itaconate and 12.2% of methallyl alcohol.

Five parts of the interpolymer are intimately mixed with 1.0 part of maleic anhydride and heated to 150° C. The solution gels to an insoluble mass within 15 minutes.

*Example 5*

A mixture of 68.0 parts of allyl alcohol, 201.8 parts of diethyl fumarate and 5.6 parts of benzoyl peroxide is dissolved in 68.0 parts of cyclohexane, and the resulting solution is heated at 87–90° C. for 13.75 hours. After the usual purification, 41.5 parts of a clear, plastic solid are obtained which is soluble in acetone and allyl alcohol but insoluble in n-hexane.

Analysis: Found—C, 57.95%; H, 7.08%; iodine number 7.0 $[\eta]_0$ 0.066.

The analysis indicates an interpolymer containing approximately 26.4% by weight of diethyl fumarate units, 0.8% of allyl alcohol units, 6.97% of allyl ethyl fumarate units, and 65.8% of the isomeric lactone units.

Thus the interpolymer is formed from approximately 80% by weight of diethyl fumarate and 20% of allyl alcohol.

Example 6

(a) This illustrates the alcoholysis of my new interpolymers with 2-propenyl alcohols. Sixty parts of a copolymer prepared as in Example 2(a) are dissolved in 250 parts of methallyl alcohol and refluxed for 14 hours in the presence of 0.2 part of sodium hydroxide as an esterification catalyst. During the alcoholysis a mixture of methallyl and methyl alcohol is removed by distillation. At the conclusion of the reaction, the reaction mixture is decanted from the catalyst and unreacted methallyl alcohol is removed by distillation under diminished pressure. The residue is purified by dissolving it in acetone and precipitating with n-hexane, and after drying to constant weight, 50 parts of a white solid are obtained which softens at approximately 60° C. and is readily soluble in acetone and in 2-propenyl alcohols, such as allyl and methallyl alcohols.

Analysis: Found—Iodine number, 12.0.

The increase in the iodine number over that of the original interpolymer indicates that unsaturation has been introduced into the polymer by alcoholysis with methallyl alcohol.

(b) Six parts of the alcoholyzed interpolymer prepared in (a) above are dissolved in 4 parts of methyl acrylate with 0.10 part of benzoyl peroxide, and the resulting solution is heated for 5 hours at 60° C. and then for 2 additional hours at 110° C. The resulting casting is hard, tough and insoluble in acetone.

A similar but harder product is obtained when allyl acrylate is substituted for the methyl acrylate in (b).

While I have shown and described various embodiments of the invention, it is to be understood that the invention is susceptible to those modifications which appear within the spirit of the invention and the scope of the appended claims.

Having thus described my invention, what I claim and desire to protect by Letters Patent is:

1. A method which comprises copolymerizing directly, in the presence of a peroxidic polymerization catalyst, a monomeric 2-alkenyl alcohol selected from the class consisting of allyl alcohol, methallyl alcohol and ethallyl alcohol, and a monomeric souble diester of an alpha-unsaturated dicarboxylic acid with a monohydric alkanol, at a temperature from about 25° C. up to the reflux temperature at atmospheric pressure of the reaction mix to form a soluble copolymer of said monomers, and in which the molar ratio of the alcohol to the diester in the original reaction mix ranges from 10:1 to 1:5.

2. A method which comprises copolymerizing directly, in the presence of a peroxidic polymerization catalyst, a monomeric 2-alkenyl alcohol selected from the class consisting of allyl alcohol, methallyl alcohol and ethallyl alcohol, and a monomeric soluble diester of an alpha-unsaturated dicarboxylic acid with a monohydric alkanol, at a temperature from about 25° C. up to the reflux temperature at atmospheric pressure of the reaction mix to form a soluble copolymer of said monomers, and concurrently alcoholyzing the soluble copolymer, whereby to form an unsaturated alcoholyzed soluble interpolymer, and in which the molar ratio of the alcohol to the diester in the original reaction mix ranges from 10:1 to 1:5.

3. A method which comprises heating directly with each other, in the presence of a peroxidic polymerization catalyst, a monomeric 2-alkenyl alcohol selected from the class consisting of allyl alcohol, methallyl alcohol and ethallyl alcohol, and a monomeric soluble diester of an alpha-unsaturated dicarboxylic acid with a monohydric alkanol, at a temperature in the range from about 25° C. to the reflux temperature at atmospheric pressure of the reaction mix, and halting the reaction short of forming an insoluble interpolymer of said monomers, and in which the molar ratio of the alcohol to the diester in the original reaction mix ranges from 10:1 to 1:5.

4. A soluble unsaturated alcoholyzed interpolymerizate of a monomeric 2-alkenyl alcohol selected from the class consisting of allyl alcohol, methallyl alcohol and ethallyl alcohol, and a monomeric soluble diester of an alpha-unsaturated dicarboxylic acid with a monohydric alkanol, produced as set forth in claim 2.

PLINY O. TAWNEY.

REFERENCES CITED

The following references are of record in the file of this patent:

UNITED STATES PATENTS

| Number | Name | Date |
|---|---|---|
| 2,221,663 | Rothrock | Nov. 12, 1940 |
| 2,280,242 | Kropa et al. | Apr. 21, 1942 |
| 2,332,900 | D'Alelio | Oct. 26, 1943 |

Certificate of Correction

Patent No. 2,507,871                                        May 16, 1950

PLINY O. TAWNEY

It is hereby certified that error appears in the printed specification of the above numbered patent requiring correction as follows:

Column 3, lines 28 to 32, inclusive, for that portion of the formula reading and that the said Letters Patent should be read with this correction therein that the same may conform to the record of the case in the Patent Office.

Signed and sealed this 1st day of August, A. D. 1950.

[SEAL]

THOMAS F. MURPHY,
*Assistant Commissioner of Patents.*